United States Patent
Mouni et al.

(10) Patent No.: US 10,431,984 B2
(45) Date of Patent: Oct. 1, 2019

(54) POWER-GENERATING SYSTEM WITH IMPROVED TREATMENT OF CHARGING IMPACTS, LOAD-SHEDDING AND HARMONICS

(71) Applicants: MOTEURS LEROY-SOMER, Angouleme (FR); UNIVERSITE DE POITIERS, Poitiers (FR)

(72) Inventors: Emile Mouni, Angouleme (FR); Philippe Manfe, Linars (FR); Faycal Bensmaine, Poitiers (FR); Slim Tnani, Sevres-Anaumont (FR); Gerard Champenois, Saint-Benoit (FR)

(73) Assignees: MOTEURS LEROY-SOMER, Angouleme (FR); UNIVERSITE DE POITIERS, Poitiers (FR)

( * ) Notice: Subject to any disclaimer, the term of this patent is extended or adjusted under 35 U.S.C. 154(b) by 0 days.

(21) Appl. No.: 15/742,762

(22) PCT Filed: Jul. 7, 2016

(86) PCT No.: PCT/EP2016/066133
§ 371 (c)(1),
(2) Date: Jan. 8, 2018

(87) PCT Pub. No.: WO2017/005856
PCT Pub. Date: Jan. 12, 2017

(65) Prior Publication Data
US 2018/0205229 A1     Jul. 19, 2018

(30) Foreign Application Priority Data
Jul. 9, 2015 (FR) ...................... 15 56497

(51) Int. Cl.
*H02M 1/12*     (2006.01)
*H02J 3/18*     (2006.01)
(Continued)

(52) U.S. Cl.
CPC ............ *H02J 3/1857* (2013.01); *H02J 3/32* (2013.01); *H02M 1/12* (2013.01); *H02M 7/72* (2013.01);
(Continued)

(58) Field of Classification Search
CPC ............ H02J 3/1857; H02J 3/32; H02M 1/12; H02M 7/72; H02M 3/158; H02M 2007/4815; Y02B 70/1441; Y02E 40/26
See application file for complete search history.

(56) References Cited

U.S. PATENT DOCUMENTS 5,668,707 A * 9/1997 Barrett ................ H02J 1/102
363/44
7,596,008 B2   9/2009 Iwata et al.
(Continued)

FOREIGN PATENT DOCUMENTS

WO   WO 2014/147294 A1   9/2014
WO   WO 2014/147297 A1   9/2014

OTHER PUBLICATIONS

J. Singh, R. Mittal and D. K. Jain, "Improved performance of diesel driven permanent magnet synchronous generator using Battery Energy Storage System," 2009 IEEE Electrical Power & Energy Conference (EPEC), Montreal, QC, 2009, pp. 1-6.*
(Continued)

*Primary Examiner* — Adolf D Berhane
*Assistant Examiner* — Jye-June Lee
(74) *Attorney, Agent, or Firm* — Oblon, McClelland, Maier & Neustadt, L.L.P.

(57) ABSTRACT

The invention relates to a system for generating electric power, comprising: an alternator (1) for coupling with a drive system (7), supplying an AC voltage to an output bus (10); a reversible AC/DC converter (2) in which the AC bus (6) is connected to the output bus (10) of the alternator (1);
(Continued)

Figure 1:
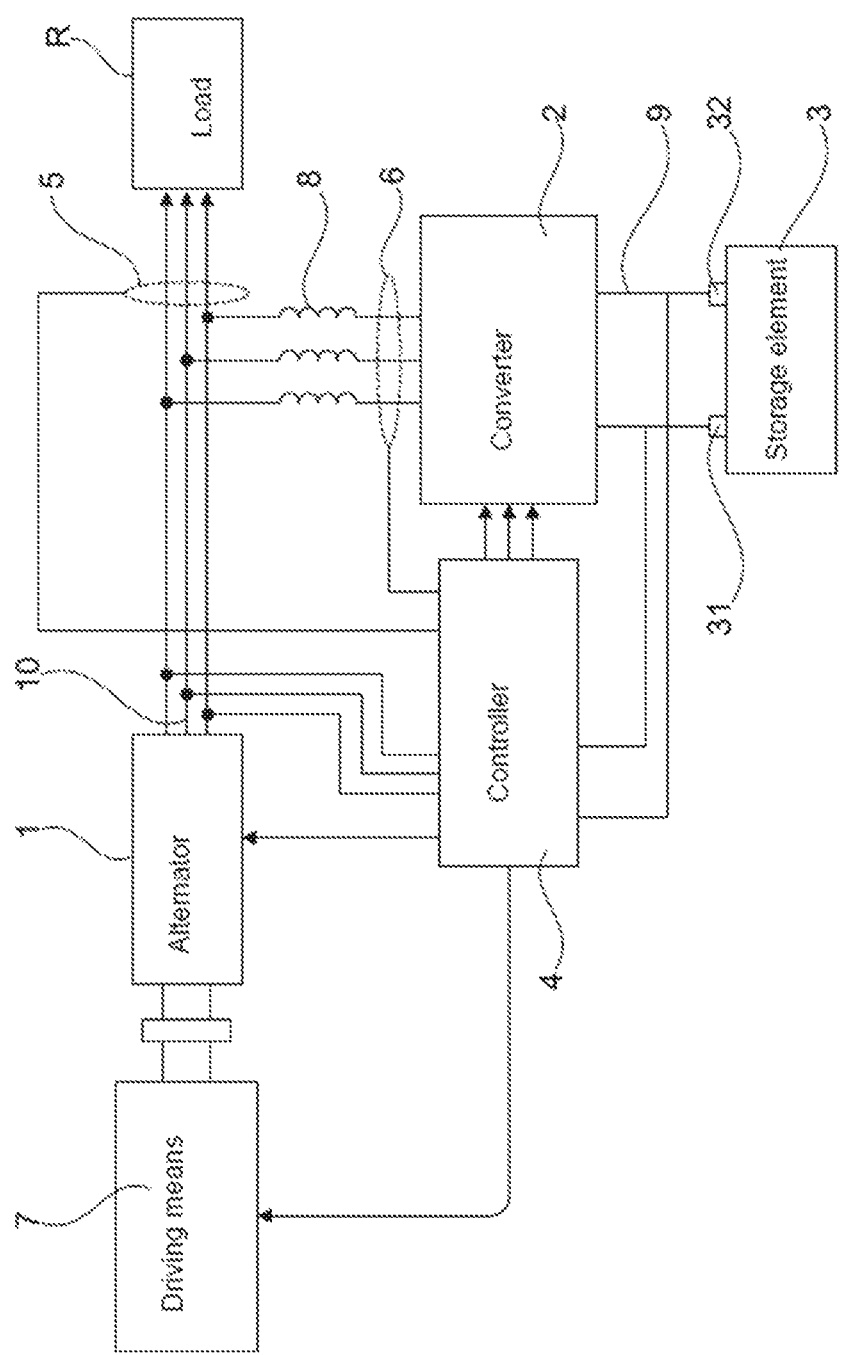

an electricity-storage element (3) connected to the DC bus (9) of the converter (2); a controller (4) arranged to react to a transient state of load-shedding or charging impact by controlling the converter (2) so as to collect energy on the output bus (10) of the alternator (2) and to store same in the storage element (3) in the case of load-shedding, and to collect energy in the storage element (3) and to inject same into the output bus (10) in the case of charging impact, the converter (2) being controlled so as to inject currents to compensate for harmonic currents into the AC bus (10) of the alternator (1).

21 Claims, 6 Drawing Sheets

(51) Int. Cl.
  *H02J 3/32*   (2006.01)
  *H02M 7/72*   (2006.01)
  *H02M 3/158*   (2006.01)
  *H02M 7/48*   (2007.01)

(52) U.S. Cl.
  CPC .... *H02M 3/158* (2013.01); *H02M 2007/4815* (2013.01); *Y02B 70/1441* (2013.01); *Y02E 40/26* (2013.01)

(56) References Cited

U.S. PATENT DOCUMENTS

| | | |
|---|---|---|
| 8,144,491 B2 | 3/2012 | Bendre et al. |
| 8,737,098 B2 | 5/2014 | Bendre et al. |
| 2009/0195074 A1 | 8/2009 | Buiel |
| 2013/0128636 A1 | 5/2013 | Trainer et al. |
| 2015/0188362 A1* | 7/2015 | Mondal ................ H02M 3/156 307/52 |

OTHER PUBLICATIONS

M. van Voorden, L. M. R. Elizondo, G. C. Paap, J. Verboomen and L. van der Sluis, "The Application of Super Capacitors to relieve Battery-storage systems in Autonomous Renewable Energy Systems," 2007 IEEE Lausanne Power Tech, Lausanne, 2007, pp. 479-484.*

C. Cecati, A. Dell'Aquila and M. Liserre, "A novel three-phase single-stage distributed power inverter," in IEEE Transactions on Power Electronics, vol. 19, No. 5, pp. 1226-1233, Sep. 2004.*

International Search Report dated Aug. 26, 2016 in PCT/EP2016/066133, citing documents AA, AO, and AX through AZ therein, 3 pages.

French Search Report dated Mar. 10, 2016 in French Patent Application No. 1556497 (with Engiish translation of Category of Cited Documents), citing documents AA, AO, AY and AZ therein, 2 pages.

Wetzer Pierre, "Machines Synchrones-Excitation", Techniques De L'Ingénieur, Feb. 10, 1997, pp. D3 545-1-11, with cover pages.

Jashvir Singh, et al., "Improved Performance of Diesel Driven Permanent Magnet Synchronous Generator Using Battery Energy Storage System". IEEE Electrical Power & Energy Conference. XP31642150. Oct. 22, 2009, pp. 1-6.

Eid, A., et al., "Active Power Filters for Harmonic Cancellation in Conventional and Advanced Aircraft Electric Power Systems", Electric Power Systems Research, vol. 79 No. 1, XP025572105, Jan. 1, 2009, pp. 80-88.

Bohorquez, Veronica B., "A Control Algorithm for Hybrid Compensation of Fast Varying Loads", Electrical Power Quality and Utilisation, XP03122506, Oct. 9, 2007, pp. 1-6.

* cited by examiner

POWER-GENERATING SYSTEM WITH IMPROVED TREATMENT OF CHARGING IMPACTS, LOAD-SHEDDING AND HARMONICS

The invention relates to the production of electrical energy using an alternator mechanically coupled to a driving motor.

The alternator is conventionally equipped with a voltage regulator and the driving motor is controlled according the power demand.

Charging impact and load-shedding cases may occur and the power components of the alternator are dimensioned accordingly.

This may result in an overdimensioning of these components in relation to the nominal operating conditions, which is reflected in the cost of the installation.

There is thus a need to reduce the size of the power components of the electrical energy generation installation.

It is also desirable to improve the behavior of the installation in transient conditions, in particular in load-shedding and/or charging impact cases.

The publication "*Active power filters for harmonic cancellation in conventional and advanced aircraft electric power systems*" discloses a conventional active filtering system applied to the onboard network of airplanes whose aim is to neutralize the harmonics. This publication neither discloses nor suggests the control of the system to react to the transient active and/or reactive power conditions in load-shedding or charging impact cases.

There is also an interest in reducing the intensity of the harmonic currents produced by the installation in order to satisfy the most stringent standards, particularly in the case of injection of the current produced on the network.

The invention attempts to respond wholly or partly to these needs and does so by virtue of an electromechanical system comprising:
  an alternator to be coupled to a driving system, delivering an alternating voltage to an output bus,
  an AC/DC reversible converter whose AC input/output is linked to the output bus of the alternator,
  an electrical storage element linked to the DC input/output of the converter,
  a controller arranged to react to transient load-shedding or charging impact conditions, by controlling the converter in such a way as to take energy from the output bus of the alternator and store it in the storage element in load-shedding cases, and to take energy from the storage element and inject it onto the output bus in charging impact cases.

The AC input/output of the converter is also called AC bus, and the DC input/output is called DC bus.

The invention makes it possible to improve the response of the system in transient conditions.

The converter is advantageously controlled to inject harmonic current neutralization currents on the AC output bus of the alternator.

Preferably, the controller allows control of the motor torque from the storage element in charging impact and load-shedding cases.

The controller is preferably arranged to react to transient active and/or reactive power conditions on a micronetwork as defined hereinbelow, in the load-shedding or charging impact case, by controlling the imbalance(s) in form that may reach up to 30% harmonic distortion rate, in amplitude whatever the level of the charge and in response time by virtue of the control of the converter managing the energy on the output bus of the alternator. A "micronetwork" should be understood to be an alternator operating in isolation or in parallel with other alternators provided that the total power of the overall network remains less than 5 times the power of said alternator.

Preferably, the storage element is invoked only in transient active and/or reactive power conditions.

Preferably, the alternator is three-phase.

In the system according to the invention, the output voltage of the alternator is used not only to power the load or loads which are connected to it but also to charge the storage element via the reversible converter.

This storage element is preferably composed of a supercapacitor but any other storage means falls within the scope of the invention, such as a conventional capacitor or a battery.

The reversible converter allows the transformation of the alternating voltage into continuous voltage upon the charging of the supercapacitor or other storage element, by ensuring a rectifier function in normal operation or in a load-shedding case. The invention makes it possible to avoid an overvoltage on the output bus in a load-shedding case, or at the very least reduce the amplitude thereof.

In a charging impact case, the converter ensures an inverter function and limits the voltage dip by injecting onto the alternating voltage bus energy taken from the supercapacitor or other storage element.

The electronic converter may use electronic switches such as IGBTs, but any other controlled electronic component falls within the scope of the invention.

The supercapacitor may be formed by a single component or by a set of components linked electrically in series and/or in parallel, so as to reach the isolation voltage and/or the capacitance sought.

The application US 2009/0195074 A1 discloses a storage system-based solution in the drilling application. In this application, management strategy makes it possible to manage the power demanded by the drilling system by taking the necessary energy from the storage system.

The system preferably comprises a passive filter, this passive filter comprising an inductance connected between each phase of the output bus of the alternator and a corresponding phase of the AC input/output of the converter. This passive filter is intended to eliminate the high frequencies.

The converter may be of "triple boost" type, that is to say comprise three arms each comprising an inductance $L_f$ linked by a first terminal to a first terminal of the storage element, a first electronic switch linked to a second terminal of the inductance $L_f$ and to a corresponding phase of the AC input/output of the converter, a second electronic switch linked to the second terminal of the inductance $L_f$ and to a second terminal of the storage element, and a balancing capacitor $C_f$ arranged between the corresponding phase of the AC input/output of the converter and the second terminal of the storage element.

This structure makes it possible to reduce the continuous voltage level at the terminals of the storage element, and the cost thereof.

Examples of "triple boost" converters are for example disclosed in the patents U.S. Pat. Nos. 7,596,008 B2 and 8,737,098 B2.

As a variant, the converter may be of the multi-level type, for example with p levels, p being an integer greater than 2. The converter may thus comprise three arms each comprising a first group of p switches electrically connected in series between a terminal of the storage element and a phase of the AC bus of the converter, and a second group of p electrical switches connected in series between the same phase of the AC bus of the converter and the other terminal of the storage element.

Each arm may comprise p−1 balancing capacitors, each balancing capacitor being connected by a terminal between the $n^{th}$ and $n+1^{th}$ electronic switches of the first group, counted from the respective phase of the AC bus and by the other terminal between the $n^{th}$ and the $n+1^{th}$ electronic switches of the second group, counted from the same phase of the AC bus.

Multi-level converters with floating capacitances are described in the publications U.S. Pat. Nos. 8,144,491 B2 and US 20130128636 A1. The balancing capacitors may be conventional capacitors, supercapacitors or batteries.

Compared to the "triple boost" converter structure, the multi-level structure makes it possible to reduce the fluctuations of the output voltage of the invertor and allows the system to use a passive filtering having inductances of lower value, which reduces the volume, the weight and the cost of the passive filter.

The converter is driven in such a way as to react to the charging impact and load-shedding cases by virtue of a controller which addresses to it respective control signals $S_a$, $S_b$, $S_c$ for each of the phases, and which analyzes the currents and the voltage on the AC bus of the converter.

The control signals $S_a$, $S_b$, $S_c$ of the converter are for example generated upon the implementation of a method for driving the converter comprising the following steps:
 calculation of active and reactive components $i_d$, $i_q$ of the three-phase current $i_a$, $i_b$, $i_c$ of the AC bus of the converter, preferably in a revolving Park reference frame of the same frequency,
 calculation of reference active and reactive currents $i_d^*$, $i_q^*$ in the same Park reference frame,
 calculation of reference voltages $\beta_q$, $\beta_d$, from the differences $i_d$", $i_q$" between the reference active and reactive currents $i_d^*$, $i_q^*$ and the active and reactive components $i_d$, $i_q$ of the current $i_a$, $i_b$, $i_c$ of the AC bus of the converter, and
 calculation of power transfer control voltages $m_a$, $m_b$, $m_c$ of the converter from the reference voltages $\beta_q$, $\beta_d$, preferably by inverse Park transformation in the three-phase reference frame of the current of the AC bus of the converter $i_a$, $i_b$, $i_c$.

The reference active and reactive currents $i_d^*$, $i_q^*$ may be obtained from the active and reactive components $i_{ld}$, $i_{lq}$ of the output current of the system $i_{la}$, $i_{lb}$, $i_{lc}$, preferably in the same Park reference frame.

Preferably, the storage element is invoked to discharge only in transient conditions.

For this, the active component $i_{ld}$ of the output current of the system $i_{la}$, $i_{lb}$, $i_{lc}$ is advantageously filtered by a filter to eliminate therefrom the high frequencies and the continuous component in order to avoid having the converter exchange energy in steady-state conditions.

Preferably, each of the active and reactive components $i_{ld}$, $i_{lq}$ of the output current of the system $i_{la}$, $i_{lb}$, $i_{lc}$ is filtered by a filter whose cut-off frequency may be 100 times lower than the switching frequency of the switches.

In a variant, the reactive component $i_{lq}$ of the output currents of the system $i_{la}$, $i_{lb}$, $i_{lc}$ is filtered so as to obtain a zero reactive current $i_{qp}$ in the alternator.

Thus, the invention makes it possible to neutralize the reactive power, with the converter, and thus obtain a unit cosφ seen by the alternator.

The application WO 2014/147297 A1 discloses an uninterruptable power supply with a storage element which may supply the active power to the load through lack of one or more phases of the source (all or nothing). When the source is normal, the invertor is used in active current filtering and in rebalancing the phase currents; however, this solution does not manage the transient conditions between the power of the source and that of the load.

Quantities other than the output currents of the system $i_{la}$, $i_{lb}$, $i_{lc}$ may be used for the calculation of the reference active and reactive currents $i_d^*$, $i_q^*$. That may make it possible to reduce the number of sensors, in particular current sensors. For example, the reference active and reactive currents $i_d^*$, $i_q^*$ may be calculated respectively as a function at least of the speed Ω of the driving system and of the excitation current $i_f$ of an exciter of the alternator. This calculation is for example illustrated in "Machines synchrones—excitation. *Techniques de l'ingénieur*, D3545, 1997" [Synchronous machines—excitation. *Engineer techniques*, D3545, 1997] by P. Wetzer.

Moreover, the converter is controlled to inject harmonic current neutralization currents on the AC output bus of the alternator. Preferably, the converter comprises at least one active filter function for generating control voltages for these electronic switches, inducing a neutralization of the harmonic currents. These control voltages may be added to the power transfer control voltages to obtain the control signals $S_a$, $S_b$, $S_c$ of the converter.

That makes it possible to cancel the harmonic currents in the alternator with the solid-state converter by performing the active filtering of the current harmonics deriving from a non-linear load.

The invention also makes it possible to cancel the harmonic currents in the solid-state converter by producing a "plug" circuit for the voltage harmonics deriving from the alternator and/or from the non-linear load.

The harmonic current neutralization control voltages may be obtained at least by calculation of the active and reactive components $i_{dn}$, $i_{qn}$ of the output currents of the alternator $i_{pa}$, $i_{pb}$, $i_{pc}$, preferably in a revolving Park reference frame, of a frequency n times greater than the frequency of the three-phase reference frame, n being an integer greater than 2. That makes it possible to reduce, and better cancel, the harmonic currents in the alternator.

This active filtering principle may be applied to all the harmonic currents that are to be neutralized. It is sufficient to multiply this neutralization structure and to add all the control voltages in the three-phase reference frame. Any harmonic filtering combination composed of at least one active filter thus falls within the scope of the invention.

For example, the harmonic current neutralization control voltages may also be calculated from the active and reactive components of the current $i_a$, $i_b$, $i_c$ of the AC bus of the converter in a revolving Park reference frame, preferably n times greater than the frequency of the three-phase reference frame, n being an integer greater than 2. That makes it possible to avoid having the harmonic voltages of the three-phase network created by the alternator produce harmonic currents in the converter.

The value of the active reference current $i_d^*$ may be subtracted from a control current of the storage element $\mathrm{Id}_{VDC}$ before being used for the calculation of the reference voltages $\beta_q$, $\beta_d$ in order to avoid exceeding a predefined safety voltage threshold, this control current $\mathrm{Id}_{VDC}$ being a function at least of the voltage $V_{DC}$ at the terminals of the storage element and of the direct nominal current $\mathrm{Id}_n$ of the alternator.

Figure 2:
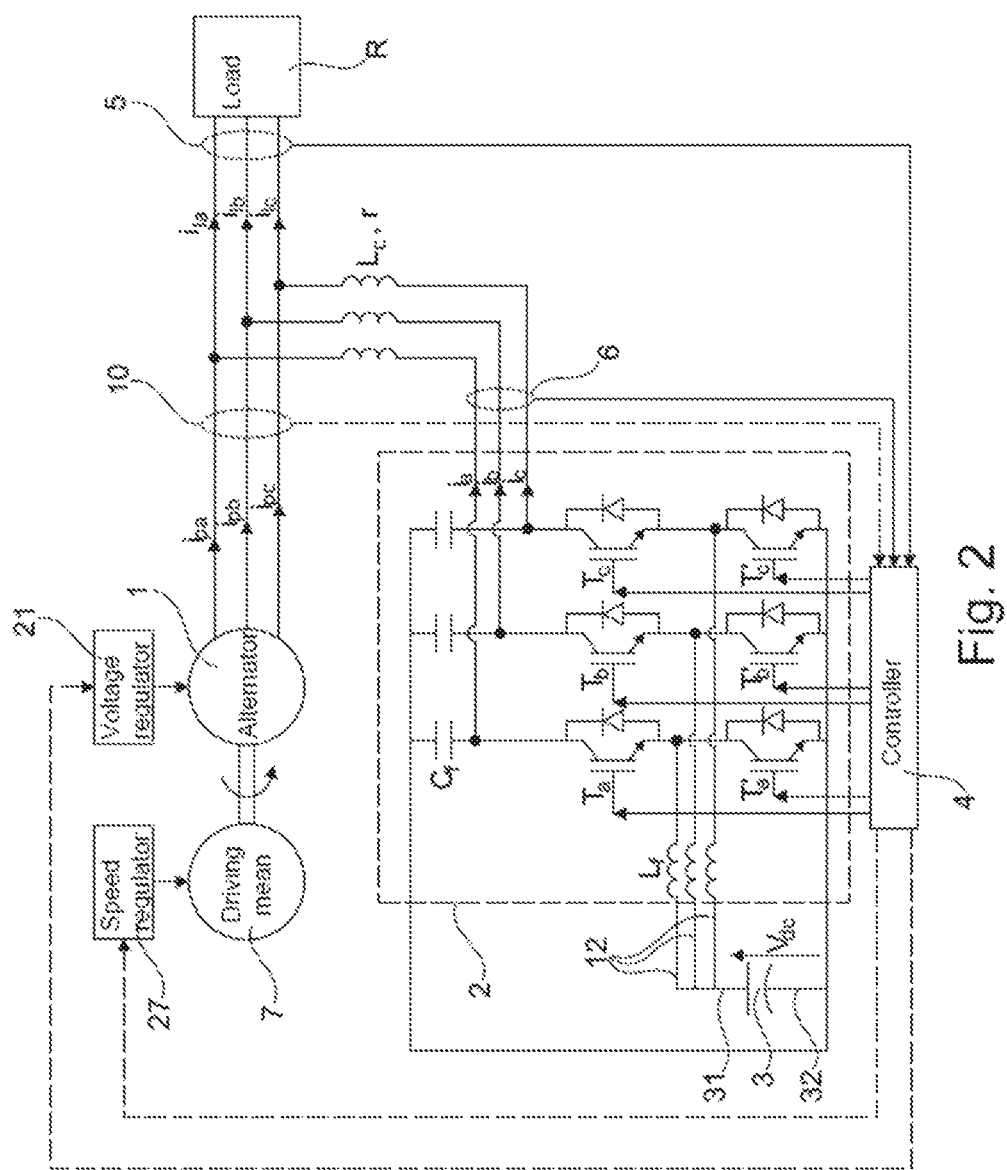
Figure 3:
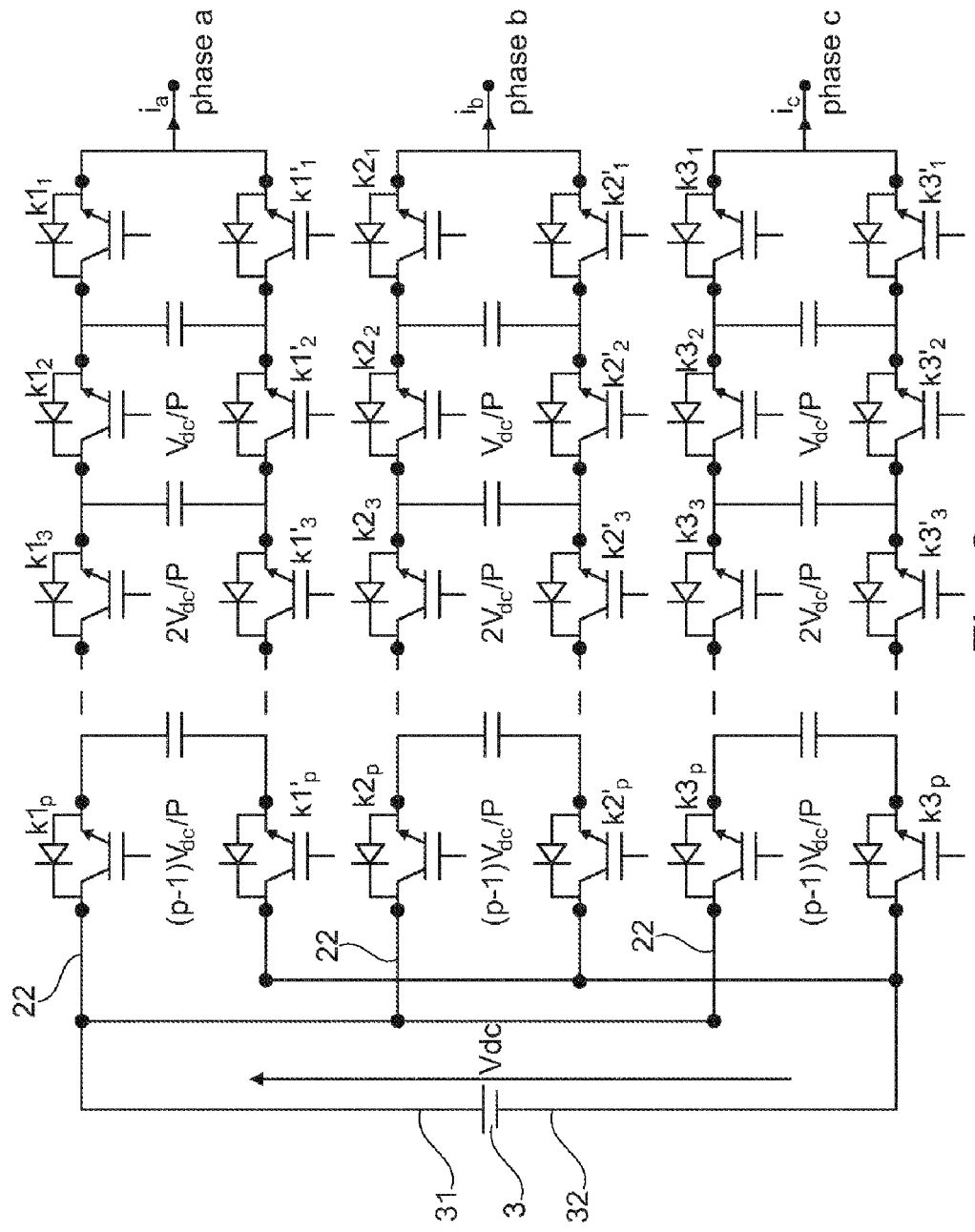
Figure 4:
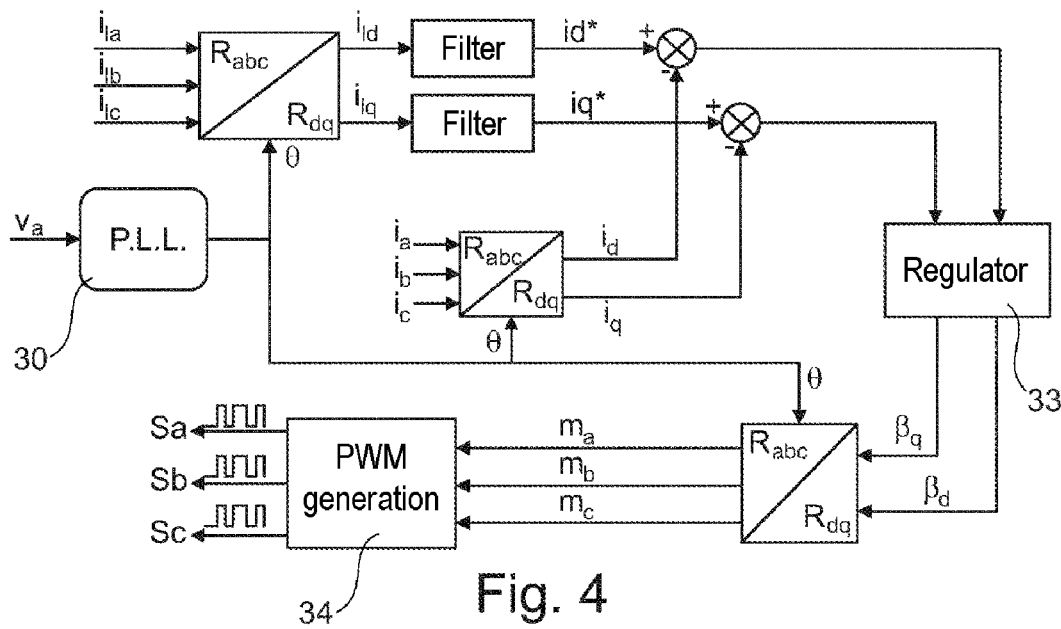
Figure 5:
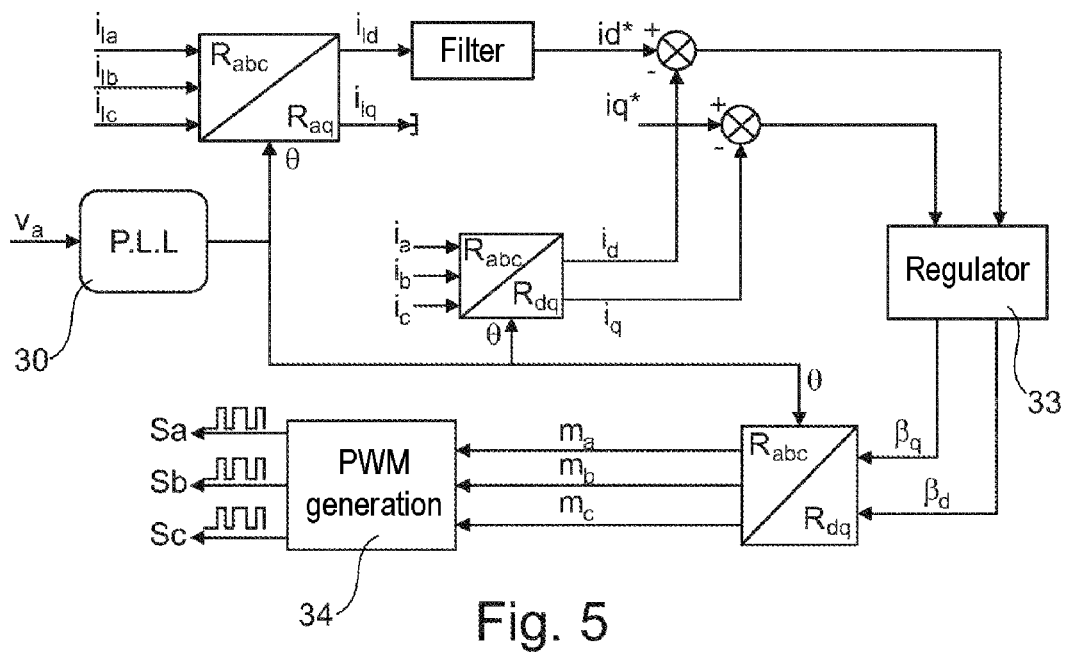
Figure 6:
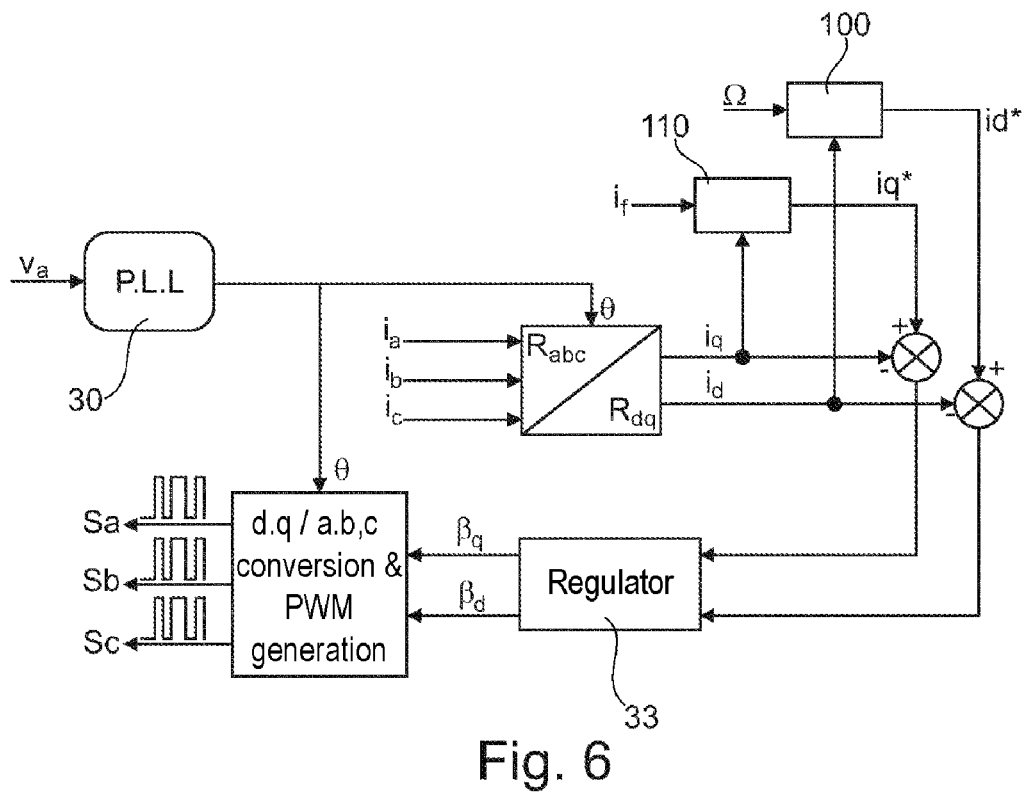
Figure 7:
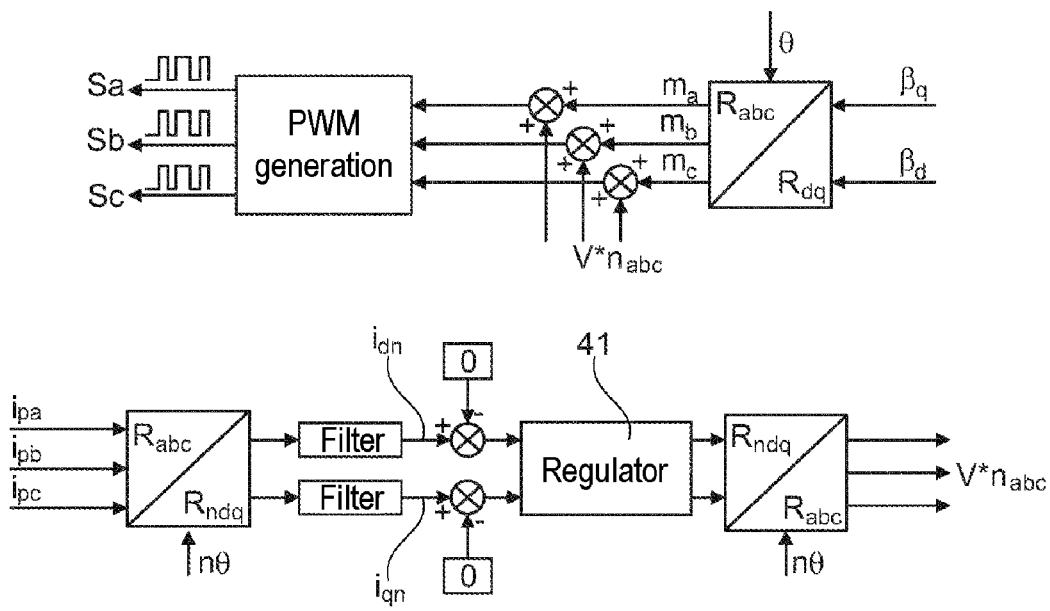
Figure 8:
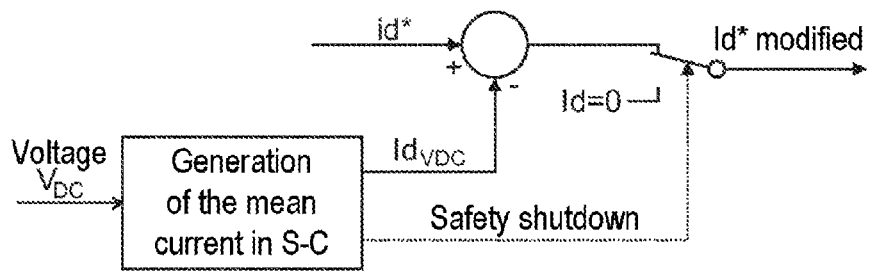
Figure 9A:
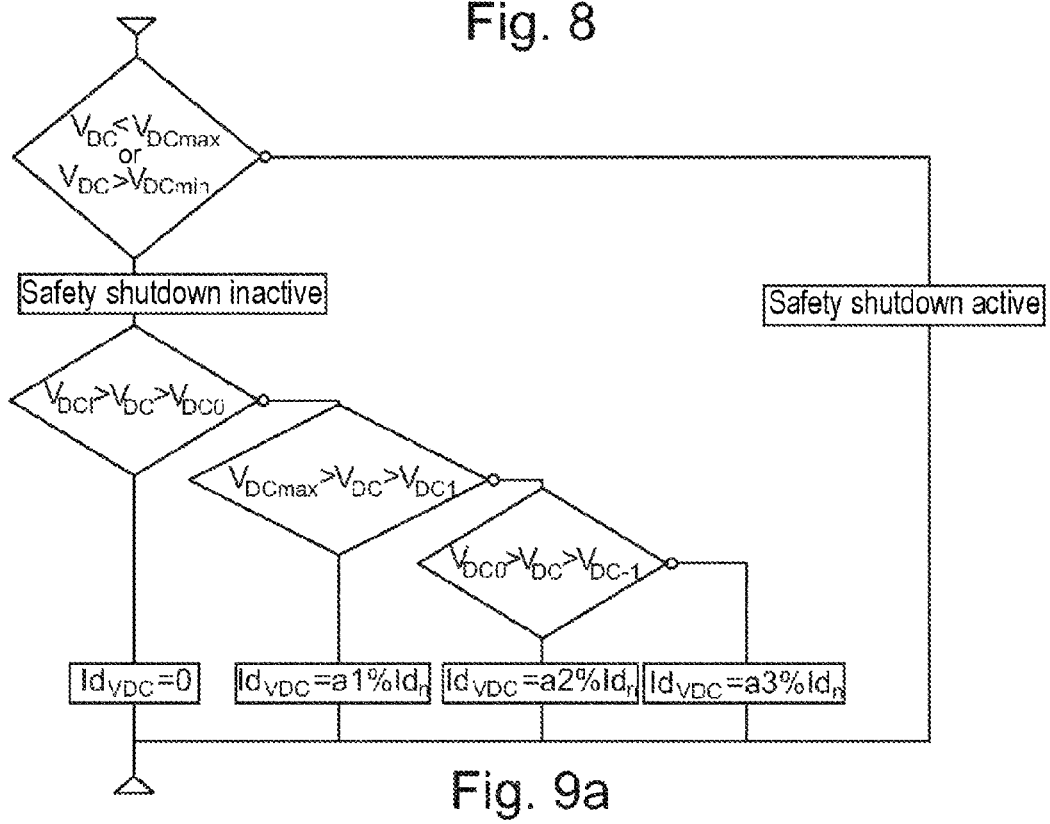
Figure 9B:
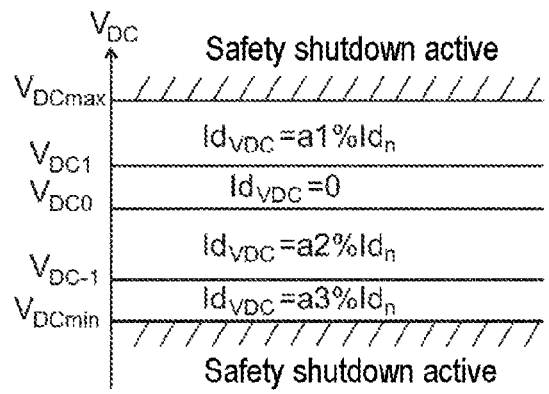

The invention will be able to be better understood on reading the following detailed description of nonlimiting examples of implementation thereof, and on studying the attached drawing, in which:

FIG. 1 is a schematic representation of a system according to the invention, in the case of a three-phase generator, FIG. 2 represents a triple-boost type converter structure, FIG. 3 represents a multi-level converter structure with (p+1) levels for p cells, FIG. 4 is an example of a control scheme allowing management of the storage element during the transient phases, FIG. 5 is a view similar to FIG. 4, of a variant control scheme with a free reference for the reactive power allowing the user to choose any reactive power level to be neutralized, FIG. 6 presents a variant control scheme from a model based on the speed of rotation of the group and the excitation current of the alternator, FIG. 7 presents a harmonic current control structure in order to produce an active filtering, FIG. 8 illustrates a method for managing the voltage at the terminals of the supercapacitor, FIG. 9a illustrates an example of a method for charging the supercapacitor with a safety function, and FIG. 9b illustrates an example of thresholds for triggering the charging and the safe shutdown of the system as a function of the voltages at the terminals of the storage element $V_{DC}$.

FIG. 1 shows an example of an installation according to the invention, for energy production delivered to an output bus 10 linked to the three-phase network or to one or more loads R.

The installation comprises a driving means 7 such as a heat engine for example, or any other driving means, wind- or hydro-powered. The driving means 7 rotationally drives the rotor of an alternator 1, also called generator, comprising an exciter powering a main inductor arranged on the rotor, the main armature being linked to the output bus 10.

The alternator 1 is driven in rotation at a regulated speed, but the output bus 10 may be subject to charging impact or load-shedding cases.

The installation comprises an AC/DC reversible converter 2 driven by a controller 4, and a storage element 3.

The controller 4 may know, from current sensors in the example of FIG. 1, the current in each of the phases 5 of the load R and the current of each phase of the AC bus 6 of the converter 2, as well as the voltage of each of the phases of the output bus 10 of the alternator 1.

In the example illustrated in FIG. 1, each phase of the AC bus of the converter 2 comprises an inductance 8, in series between the converter 2 and the corresponding phase of the output bus of the alternator 1. The dimensioning of these inductances 8 depends on the power of the installation.

In normal operation, the controller 4 ensures the voltage regulation of the alternator 1 through the detection of the voltage of the output bus 10 of the alternator 1. In the case of a conventional wound exciter, the controller 4 may be provided with a power element allowing it to supply the exciting inductor with the excitation current required to ensure the desired regulation of the output voltage of the alternator 1.

To ensure the charging/discharging of the storage element 3, the controller sends control commands to the reversible electronic converter 2. A continuous supervision of the charging/discharging voltage $V_{DC}$, of the charging/discharging currents of the storage element 3, and of the transient state (impact, load-shedding) of the system is carried out for this.

In a load-shedding case, a command to charge the storage element 3 is given to make it possible to best reduce the voltage overshoot of the alternator. There is a recharging of the storage element 3 also when the level of the storage element 3 is below certain predefined thresholds.

For its part, the discharging command is given in charging impact cases, to limit the voltage drop at the terminals of the alternator 1, or when the level of the storage element 3 is above a predefined threshold.

The control commands may be sent by wire or wirelessly without departing from the scope of the present invention.

The controller 4 also ensures, in the example illustrated, the communication with the driving motor 7, advantageously allowing an anticipation of the speed variation due to an impact or load-shedding case. In effect, by virtue of the measurement of the output current of the system $i_{la}$, $i_{lb}$, $i_{lc}$ and of that exchanged with the storage element 3, the controller 4 may estimate the power involved and determine a set point that makes it possible to anticipate the intake of fuel to the engine in order to limit the disturbances on the output bus of the alternator in transient conditions.

The controller 4 thus advantageously supervises:
- the control of the active and reactive power exchanges on the one hand between the three-phase network created by the alternator 1 and on the other hand the load or loads R, using the three-phase converter 2 connected to the storage element 3 with direct current,
- the management of the harmonic currents added by the electromotive force of the machine or by a non-linear load R connected to the alternator 1, and
- in the case where the storage consists of a supercapacitor, the management of the voltage 9 at the terminals of this element.

FIG. 2 illustrates a system comprising a converter 2 of "triple boost" type.

The converter 2 comprises three arms 12, each comprising an inductance $L_f$ linked by a first terminal to the positive terminal 31 of the storage element 3, a first electronic switch $T_a$, $T_b$ or $T_c$ linked between a second terminal of the inductance $L_f$ and a corresponding phase a, b or c of the AC bus of the converter, a second electronic switch $T_a'$, $T_b'$ or $T_c'$ linked between the second terminal of the inductance $L_f$ and the negative terminal 32 of the storage element 3 and a balancing and filtering capacitor $C_f$ arranged between the corresponding phase of the AC bus of the converter and the negative terminal 32 of the storage element 3.

The currents $i_a$, $i_b$, and $i_c$ of the AC bus 6 of the converter 2 are injected on the output bus 10 of the alternator 1, the latter delivering a three-phase current $i_{pa}$, $i_{pb}$, and $i_{pc}$ for the respective phases a, b and c.

The three-phase output current of the system $i_{la}$, $i_{lb}$ and $i_{lc}$ may also be measured, for example by sensors 5.

The controller 4 ensures the control of the converter 2, may also be configured to act on the speed regulator 27 of the heat engine 7 and/or on the voltage regulator 21 of the alternator 1.

FIG. 3 illustrates a variant converter with p cells, p being an integer greater than 2.

The converter comprises three arms 22 each comprising a first group of p switches $K1_1$, $K1_2$ . . . $K1_p$ electrically connected in series between a positive terminal 31 of the storage element 3 and a phase of the AC bus of the converter, and a second group of p electronic switches $K1_1'$, $K1_2'$ . . .

$K1_p'$ connected in series between the same phase of the AC bus of the converter and the negative terminal 32 of the storage element 3.

Each arm 22 may comprise p−1 balancing capacitors $C_f$, 2p IGBT, each balancing capacitor $C_f$ being connected by a terminal between the $n^{th}$ and the $n+1^{th}$ electronic switches of the first group counted from the respective phase of the AC bus and by the other terminal between the $n^{th}$ and $n+1^{th}$ electronic switches of the second group, counted from the same phase of the AC bus.

The balancing capacitor $C_f$ connected between the $n^{th}$ and $n+1^{th}$ electronic switches of the first group counted from the respective phase of the AC bus and by the other terminal between the $n^{th}$ and $n+1^{th}$ electronic switches of the second group has a voltage of $nV_{dc}/p$, where $V_{dc}$ represents the voltage at the terminals of the storage element 3.

The basic control of the active and reactive power exchanges is presented in FIG. 4.

For a fixed amplitude three-phase network, controlling the powers amounts to controlling the active and reactive currents. These currents may be controlled in a Park reference frame $R_{dq}$ synchronous with the simple voltage $v_a$ of the first phase of the three-phase network, but the use of any of the other phases falls within the scope of the invention. A phase-locked loop 30 may be used for the synchronization.

The control structure may be arranged to generate reference active $i_d^*$ and reactive $i_q^*$ currents in the Park reference frame $R_{dq}$, and then lock them to the active and reactive components $i_d$ and $i_q$, obtained by Park transformation in the same reference frame $R_{dq}$, of the currents $i_a$, $i_b$, $i_c$ actually exchanged by the converter 2 with the network, by calculating the three duty cycles of the reversible converter 2.

The generation of the reference currents $i_d^*$ and $i_q^*$ may be created from the active $i_{ld}$ and reactive $i_{lq}$ components of the output currents of the load or loads R in the Park reference frame $R_{dq}$. The active component $i_{ld}$ is filtered to eliminate the high frequencies and the continuous component of the active current in order to avoid having the reversible converter 2 exchange active or reactive energy in steady-state conditions. Thus, the active current $i_d^*$ takes account only of the transient conditions of the load (impact or load-shedding) and thus makes it possible to invoke the storage system 3 only in transient conditions. The reactive component $i_q^*$ may be treated in the same way as the active component $i_d^*$, in order to minimize the time for which the reversible converter 2 is invoked.

In a variant, the reactive power is neutralized by modifying the structure of the filter of FIG. 4 which generates $i_q^*$, which makes it possible to fully neutralize the reactive power exchanged with the load and obtain a zero reactive current $i_{qp}$ in the alternator. If necessary, the neutralization may be arbitrary, the user having the possibility of defining the reactive current level that is to be neutralized, as illustrated in FIG. 5.

Another variant of generation of the reference currents $i_d^*$ and $i_q^*$ consists in using other measured quantities. Reference active and reactive currents ($i_d^*$, $i_q^*$) is no longer directly measured but calculated respectively as a function at least of the speed (Ω) of the driving system and of the excitation current ($i_f$) of an alternator exciter. That makes it possible to dispense with the measurement of the output currents of the system $i_{la}$, $i_{lb}$, and $i_{lc}$. The information on the variation of the torque may be taken by measuring the speed variation Ω and the information on the variation of the magnetic state of the machine may be taken by measuring the excitation current $i_f$ of the exciter, as illustrated in FIG. 6.

From the measurement of the speed of the revolving group and from a mathematical model 100 of the system, it is possible to calculate a variation of the torque on the alternator and to deduce therefrom the variation of the active current in the alternator $i_{dp}$. The reactive current in the alternator $i_{qp}$ may be calculated from the measurement of the excitation current of the exciter and from the mathematical model 110 of the system. These calculations may also be found in the publication by P. Wetzer entitled "Machines synchrones—excitation. *Techniques de l'ingénieur*, D3545, 1997" [Synchronous machines—excitation. *Engineer techniques*, D3545, 1997] cited above. Thus, it is possible to deduce the two references $i_d^*$ and $i_q^*$, from the currents of the alternator calculated $i_{dp}$ and $i_{qp}$ and the currents $i_d$ and $i_q$ of the converter 2 and then the regulation function is identical to the basic control. A combination of these two variants remains within the scope of the present invention.

To generate the control signals $S_a$, $S_b$ and $S_c$ of the converter 2, the reference currents $i_d^*$ and $i_q^*$ are compared to the active and reactive components $i_d$ and $i_q$ of the three-phase current $i_a$, $i_b$, $i_c$ measured at the output of the reversible converter 2, obtained after a transformation into the Park reference frame $R_{dq}$. The current error is by a regulator 33, of PID type for example, which generates voltage references $\beta_d$ and $\beta_q$ in the Park reference frame, which, after inverse Park transformation in the three-phase reference frame $R_{abc}$, give the power transfer control voltages $m_a$, $m_b$ and $m_c$ in the latter reference frame. Finally, a pulse width modulation (PWM) function 34 makes it possible to generate the signals $S_a$, $S_b$ and $S_c$ to control the reversible converter 2.

The system is advantageously arranged to act on the harmonic currents delivered by the machine or induced by a non-linear load, by virtue of the active filtering function made possible with the structure described in the present application.

An example of control for the active filtering function is described in FIG. 7. The converter comprises at least one active filter function allowing the converter to generate neutralization voltages to avoid the harmonic currents in the converter due to the voltage harmonics on the AC side. Control voltages $V^*n_{abc}$ are added to the control voltages due to the power transfers $m_a$, $m_b$, $m_c$ to obtain the control signals $S_a$, $S_b$, $S_c$ of the converter.

The currents $i_{pa}$, $i_{pb}$, $i_{pc}$ measured at the output of the alternator are transformed into a Park reference frame $R_{ndq}$ of a frequency n times greater than the fundamental frequency of the three-phase current $i_a$, $i_b$, $i_c$ of the AC bus of the converter, the transformed currents being combined respectively with a filtering to extract the amplitude of the harmonic n in the two axes $d_n$ and $q_n$ of this Park reference frame $R_{ndq}$. These extracted currents $i_{dn}$ and $i_{qn}$ are then locked onto zero references so as to act on the output voltages of the regulator and sent to the input of a regulator 41, for example of PID type or other advanced regulator structure, whose outputs are added to the preceding operation of the converter 2 corresponding to the voltages that the converter 2 must deliver in this Park reference frame $R_{ndq}$. An inverse Park transformation, at the speed and in the direction of the harmonic n, makes it possible to obtain the neutralization control voltages $V^*n_{abc}$ of the harmonic n in the three-phase reference frame $R_{abc}$. The latter may be added to the voltages $m_a$, $m_b$ and $m_c$ delivered by the preceding control, which makes it possible to act on the active and reactive power transfers.

A variant consists in considering the currents of the converter instead of the currents of the alternator, that is to say $i_a$, $i_b$, $i_c$ instead of $i_{pa}$, $i_{pb}$, $i_{pc}$, illustrated in FIG. 7. That allows the converter to produce purely sinusoidal currents at the fundamental frequency and avoid having the harmonic voltages of the three-phase network created by the alternator produce harmonic currents in the converter. The latter control is equivalent to a plug circuit for the voltage harmonics resulting from main generator with its load.

This active filtering principle may be applied to all the harmonic currents that are to be neutralized, by reproducing the neutralization structure and by adding all the resulting voltages to obtain the control voltages of the converter.

Whatever the structure of the converter and the control laws applied, it is desirable to control the state of charge of the supercapacitor, given by its voltage $V_{DC}$. Since this is an active current in the Park reference frame which may modify this charge state, it is sufficient to modify the active reference current $i_d*$ by subtracting a current that makes it possible to act on the voltage $V_{DC}$. A safety shutdown should be provided so as to avoid exceeding the maximum voltage for the supercapacitor while maintaining the minimum voltage making it possible to ensure the correct operation of the converter 2.

FIGS. 8, 9a and 9b illustrate an example of this control of the voltage $V_{DC}$ of the supercapacitor.

The thresholds a1%, a2% and a3% representing the output current levels of the system or discharge current levels in relation to the direct nominal current Idn of the alternator, these thresholds being able to be set within the ±100% band without departing from the scope of the invention.

The values a1, a2 and a3 are determined by experimentally to avoid activating the safety function and excessively disrupting the operation of the hybrid function.

An example of control of the mean current of the supercapacitor consists in delivering an amplitude and a sign of $Id_{VDC}$ dependent on the voltage $V_{DC}$ according to programmed thresholds and applying a comparison algorithm by adding a hysteresis at the threshold level to avoid a beat effect. A safety output gives a true or false logic level to allow a current in the supercapacitor or prevent it if the thresholds are reached; when the safety function is active then Id=0. The voltage thresholds and output current levels of the system and discharge current levels may be modified without departing from the scope of this invention.

The invention claimed is:

1. An electrical energy generation system comprising:
   an alternator to be coupled to a driving system, delivering an alternating voltage to an output bus,
   an AC/DC reversible converter whose AC bus is linked to the output bus of the alternator,
   an electrical storage element linked to the DC bus of the converter,
   a controller arranged to react to transient load-shedding or charging impact conditions by controlling the converter in such a way as to take energy from the output bus of the alternator and store the energy in the storage element in load-shedding cases, and to take the energy from the storage element and inject the energy onto the output bus in charging impact cases,
   the converter being controlled to inject harmonic current neutralization currents on the AC bus of the alternator,
   the converter comprising at least one active filter function for generating harmonic current neutralization control voltages, the harmonic current neutralization control voltages being added to power transfer control voltages to obtain control signals of the converter.

2. The electrical energy generation system as claimed in claim 1, the storage element being invoked to discharge only in transient conditions.

3. The electrical energy generation system as claimed in claim 2, the storage element being invoked to discharge only in at least one of a transient active power condition and a reactive power condition.

4. The electrical energy generation system as claimed in claim 1, the controller being arranged to react to at least one of a transient reactive power condition and an active power condition on a micronetwork, upon load-shedding or charging impact, to allow control of imbalance(s) in form, in amplitude and in response time by virtue of the controlling of the converter managing the energy on the output bus of the alternator, the controller allowing dynamic control of motor torque from the storage element in the charging impact and load-shedding cases.

5. The electrical energy generation system as claimed in claim 1, the storage element being a supercapacitor.

6. The electrical energy generation system as claimed in claim 1, comprising a passive filter, the passive filter comprising an inductance connected in series between each phase of the output bus of the alternator and a corresponding phase of the AC bus of the converter.

7. The electrical energy generation system as claimed in claim 1, the converter comprising three arms each comprising a first group of p switches electrically connected in series between a terminal of the storage element and a phase of the AC bus of the converter, and a second group of p switches electrically connected in series between the same phase of the AC bus of the converter and an other terminal of the storage element, p being an integer greater than 2.

8. The electrical energy generation system as claimed in claim 7, each arm comprising p−1 balancing capacitors, each balancing capacitor being connected to a first pole between $n^{th}$ and $n+1^{th}$ switches of the first group, counted from a respective phase of the AC bus and to a second pole between $n^{th}$ and $n+1^{th}$ switches of the second group, counted from the same phase of the AC bus, n being an integer.

9. The electrical energy generation system as claimed in claim 1, the converter comprising three arms each comprising an inductance linked by a first terminal to a first terminal of the storage element, a first electronic switch linked to a second terminal of the inductance and to a corresponding phase of the AC bus of the converter, a second electronic switch linked to the second terminal of the inductance and to a second terminal of the storage element, and a balancing capacitor arranged between the corresponding phase of the AC bus of the converter and the second terminal of the storage element.

10. An electrical energy generation system comprising: an alternator to be coupled to a driving system, delivering an alternating voltage to an output bus,
   an AC/DC reversible converter whose AC bus is linked to the output bus of the alternator,
   an electrical storage element linked to a DC bus of the converter,
   a controller arranged to react to transient load-shedding or charging impact conditions by controlling the converter in such a way as to take energy from the output bus of the alternator and store the energy in the storage element in load-shedding cases, and to take the energy from the storage element and inject the energy onto the output bus in charging impact cases,
   the converter being controlled to inject harmonic current neutralization currents on the AC bus of the alternator, in which control signals of the converter are generated upon implementation of a method for driving the converter comprising calculating active and reactive components of the current of the AC bus of the converter, in a Park reference frame of the same frequency, calculating reference active and reactive currents in the same Park reference frame, calculating reference voltages, from differences between the reference active and reactive currents and the active and reactive components of the current of the AC bus of the converter, calculating control voltages for power transfers of the converter from the reference voltages by inverse Park transformation in a three phase reference of the current of the AC bus of the converter.

11. The electrical energy generation system as claimed in claim 10, reference active and reactive currents being obtained from the active and reactive components of an output current of the electrical energy generation system in the same Park reference frame.

12. The electrical energy generation system as claimed in claim 11, the active component of the output current of the electrical energy generation system being filtered by a filter to eliminate from the output current of the electrical energy generation system high frequencies and a continuous component in order to avoid having the converter exchange energy in steady-state conditions from the output current of the electrical energy generation system.

13. The electrical energy generation system as claimed in claim 12, the reactive component of the output current of the system being filtered so as obtain a zero reactive current on the alternator.

14. The electrical energy generation system as claimed in claim 11, each of the active and reactive components of the output current of the electrical energy generation system being filtered by a filter to eliminate from the output current of the electrical energy generation system high frequencies and a continuous component in order to avoid having the converter exchange energy in steady-state conditions from the output current of the electrical energy generation system.

15. The electrical energy generation system as claimed in claim 10, reference active and reactive currents being calculated respectively as a function at least of speed of the driving system and of excitation current of an exciter of the alternator.

16. The electrical energy generation system as claimed in claim 10, the harmonic current neutralization control voltages being obtained at least by calculation of active and reactive components of output currents of the alternator.

17. The electrical energy generation system as claimed in claim 16, the harmonic current neutralization control voltages being obtained at least by calculation of the active and reactive components of the output currents of the alternator in a Park reference frame of a frequency n times greater than a frequency of the three-phase reference frame, n being an integer greater than 2.

18. The electrical energy generation system as claimed in claim 10, the harmonic current neutralization control voltages being obtained at least by calculation of the active and reactive components of the current of the AC bus of the converter.

19. The electrical energy generation system as claimed in claim 18, the harmonic current neutralization control voltages being obtained at least by calculation of the active and reactive components of the current of the AC bus of the converter in a Park reference frame of a frequency n times greater than a frequency of the three-phase reference frame, n being an integer greater than 2.

20. The electrical energy generation system as claimed in claim 10, a value of the reference active current being subtracted from a supercapacitor control current before being used for calculating the reference voltages in order to avoid exceeding predefined safety voltage thresholds, the supercapacitor control current being a function at least of a voltage at terminals of the storage element and of a direct nominal current of the alternator.

21. The electrical energy generation system as claimed in claim 10, the control voltages for the power transfers of the converter being calculated by inverse Park transformation in a three-phase reference of the current of the AC bus of the converter.

* * * * *